United States Patent
Byrne et al.

(10) Patent No.: US 8,837,066 B1
(45) Date of Patent: Sep. 16, 2014

(54) ADAPTIVE BASELINE CORRECTION INVOLVING ESTIMATION OF FILTER PARAMETER USING A LEAST MEAN SQUARES ALGORITHM

(71) Applicant: LSI Corporation, San Jose, CA (US)

(72) Inventors: Jason D. Byrne, Longmont, CO (US); Scott M. Dziak, Longmont, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/255,086

(22) Filed: Apr. 17, 2014

(51) Int. Cl.
*G11B 5/09* (2006.01)

(52) U.S. Cl.
USPC ................... 360/39; 360/48; 360/53; 360/55; 360/43

(58) Field of Classification Search
None
See application file for complete search history.

(56) References Cited

U.S. PATENT DOCUMENTS

| | | | |
|---|---|---|---|
| 6,038,266 A | 3/2000 | Lee et al. | |
| 6,047,024 A | 4/2000 | How | |
| 6,717,995 B2 | 4/2004 | Zvonar | |
| 7,738,567 B2 | 6/2010 | Miller et al. | |
| 7,821,730 B2 | 10/2010 | Cao | |
| 8,005,135 B1 | 8/2011 | Manickam et al. | |
| 8,447,000 B2 | 5/2013 | Manickam et al. | |
| 8,498,073 B2 | 7/2013 | Aravind | |
| 8,498,603 B2 | 7/2013 | Aytur | |
| 8,594,172 B2 | 11/2013 | Zhong | |
| 8,730,609 B1 * | 5/2014 | Tang et al. | 360/65 |
| 2007/0286315 A1 | 12/2007 | Hong et al. | |
| 2008/0253011 A1 * | 10/2008 | Mouri et al. | 360/39 |
| 2010/0073798 A1 * | 3/2010 | Cao | 360/46 |
| 2012/0019946 A1 * | 1/2012 | Aravind | 360/39 |

FOREIGN PATENT DOCUMENTS

EP 1720041 A1 11/2006

* cited by examiner

*Primary Examiner* — Muhammad N Edun
(74) *Attorney, Agent, or Firm* — Ryan, Mason & Lewis, LLP

(57) ABSTRACT

An apparatus comprises an alternating current coupling stage comprising a first filter configured to filter an analog signal to remove relatively low-frequency energy and read channel circuitry coupled to the alternating current coupling stage. The read channel circuitry comprises an analog-to-digital converter configured to convert the filtered analog signal to a digital signal, a detector configured to obtain a recovered signal using the digital signal, and a baseline correction module comprising a second filter and being configured to estimate a parameter of the first filter using a least mean squares algorithm based at least in part on the analog signal and an output of the second filter, adjust a parameter of the second filter based on the estimated parameter and add at least a portion of the removed relatively low-frequency energy to the digital signal by combining the output of the second filter and the digital signal.

20 Claims, 6 Drawing Sheets

ADAPTIVE BASELINE CORRECTION INVOLVING ESTIMATION OF FILTER PARAMETER USING A LEAST MEAN SQUARES ALGORITHM

FIELD OF INVENTION

The field relates generally to storage devices, and more particularly to read channel circuitry in storage devices.

BACKGROUND

Disk-based storage devices such as hard disk drives (HDDs) are commonly used to provide non-volatile data storage in a wide variety of different types of data processing systems. In a typical HDD, data is read from and written to tracks of a magnetic storage disk using read channel circuitry that is coupled to a read/write head of the HDD via a preamplifier. The read channel circuitry processes data read from the disk using the read/write head and the preamplifier. The read channel circuitry also provides write data to a write driver of the preamplifier for recording on the storage disk using the read/write head.

SUMMARY

In one embodiment, an apparatus comprises an alternating current coupling stage comprising a first filter and read channel circuitry coupled to the alternating current coupling stage. The first filter is configured to filter an analog signal to remove relatively low-frequency energy from the analog signal. The read channel circuitry comprises an analog-to-digital converter configured to convert the filtered analog signal to a digital signal, a detector configured to obtain a recovered signal using the digital signal and a baseline correction module comprising a second filter. The baseline correction module is configured to estimate a parameter of the first filter, adjust a parameter of the second filter based on the estimated first filter parameter and add at least a portion of the removed relatively low-frequency energy to the digital signal by combining an output of the second filter and the digital signal. The baseline correction module is configured to estimate the first filter parameter using a least mean squares algorithm based at least in part on the analog signal and the output of the second filter.

Other embodiments of the invention include but are not limited to methods, apparatus, systems, processing devices, integrated circuits and computer-readable storage media having computer program code embodied therein.

WRITTEN DESCRIPTION

Embodiments of the invention will be illustrated herein in conjunction with exemplary storage devices comprising read channel circuitry. It should be understood, however, that these and other embodiments of the invention are more generally applicable to any storage device in which it is desirable to provide adaptive baseline correction. Additional embodiments may be implemented using components other than those specifically shown and described in conjunction with the illustrative embodiments.

Figure 1:
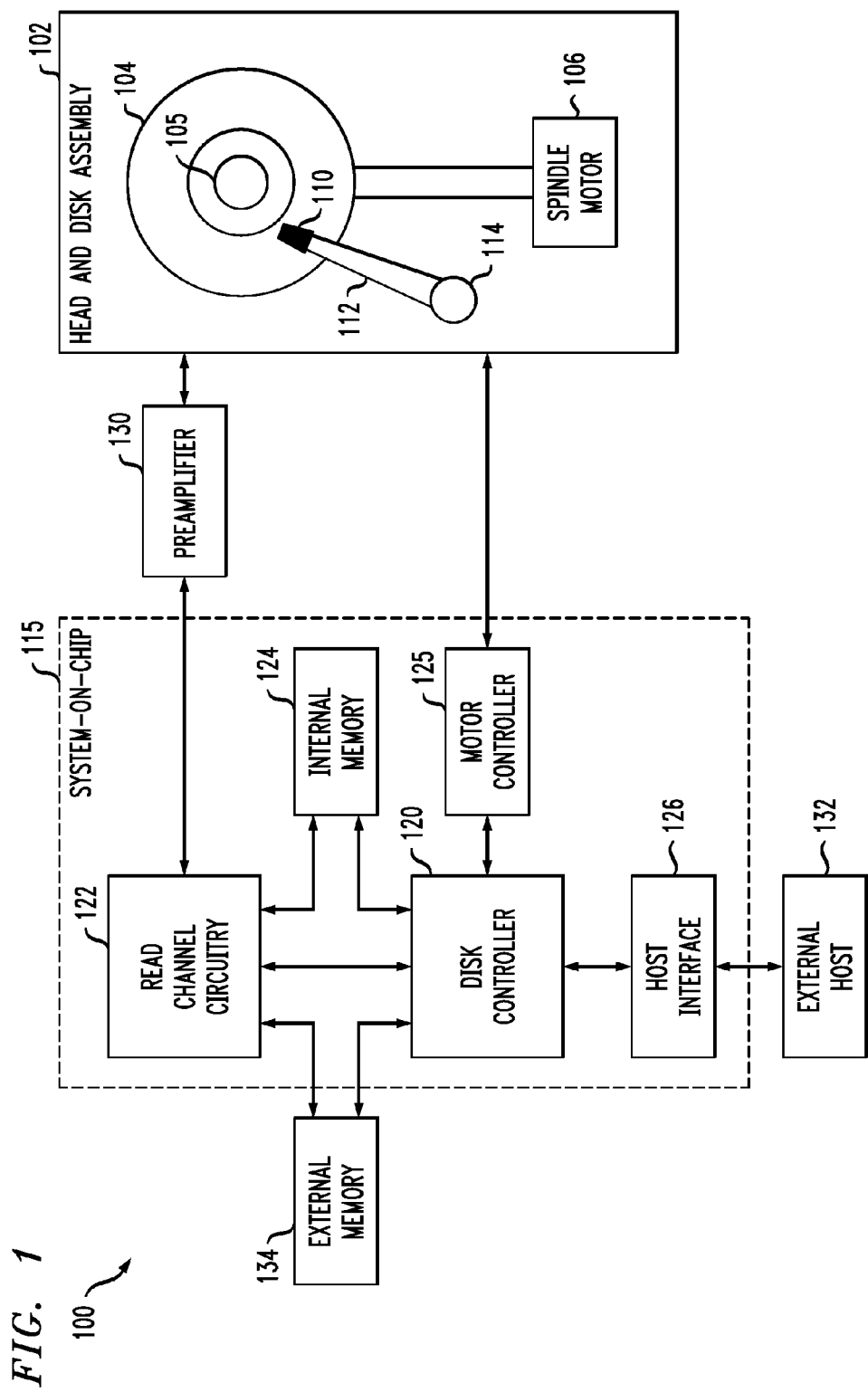
FIG. 1 shows a disk-based storage device, according to an embodiment of the invention.

FIG. 1 shows a disk-based storage device 100 in accordance with an illustrative embodiment of the invention. The storage device 100 in this embodiment more specifically comprises an HDD that includes a head and disk assembly 102 comprising a storage disk 104. The storage disk 104 has at least one storage surface coated with one or more magnetic materials that are capable of storing data bits in the form of respective groups of media grains oriented in a common magnetization direction (e.g., up or down). The storage disk 104 is connected to a spindle 105. The spindle 105 is driven by a spindle motor 106 in order to spin the storage disk 104 at high speed.

Data is read from and written to the storage disk 104 via a read/write head 110 that is mounted on a positioning arm 112. The position of the read/write head 110 over the magnetic surface of the storage disk 104 is controlled by an electromagnetic actuator 114 attached to the positioning arm 112.

The storage surface of storage disk 104 in the present embodiment is assumed to comprise a plurality of concentric tracks. Each track is subdivided into physical data sectors each of which is capable of storing a block of data for subsequent retrieval. The tracks located toward the outside edge of the storage disk have a larger circumference when compared to those located toward the center of the storage disk. The tracks are grouped into several annular zones, where the tracks within a given one of the zones have the same number of sectors. Those tracks in the outer zones have more sectors than those located in the inner zones.

The outer zones of the storage disk 104 provide a higher data transfer rate than the inner zones. This is in part due to the fact that the storage disk in the present embodiment, once accelerated to rotate at operational speed, spins at a constant angular or radial speed regardless of the positioning of the read/write head 110, but the tracks of the inner zones have smaller circumference than those of the outer zones. Thus, when the read/write head is positioned over one of the tracks of an outer zone, it covers a greater linear distance along the disk surface for a given 360° turn of the storage disk than when it is positioned over one of the tracks of an inner zone. Such an arrangement is referred to as having constant angular velocity (CAV), since each 360° turn of the storage disk takes the same amount of time, although it should be understood that CAV operation is not a requirement of embodiments of the invention.

Each data sector further comprises additional information such as, for example, a synchronization mark, a preamble, error correction code (ECC) information and padding, arranged in accordance with a particular data storage format. Exemplary data storage formats include 512-byte sector formats and 4K-byte sector formats. The latter are examples of what are also referred to as Advanced Format.

The storage disk 104 is also assumed to include servo sectors distributed over the surface of the disk. Such servo sectors are typically written at very high precision in conjunction with manufacture of the storage disk. The servo sectors provide a timing pattern comprising servo address marks (SAMs) and other information.

The particular storage disk configurations described above are presented for purposes of illustration only, and should not be construed as limiting in any way. A wide variety of other storage disk configurations may be used in other embodiments.

It is to be appreciated that, although FIG. 1 shows an embodiment of the invention in which the head and disk assembly 102 comprises only one instance of each of the storage disk 104, read/write head 110, and positioning arm 112, this is by way of illustrative example only, and alternative embodiments of the invention may comprise multiple instances of one or more of these or other HDD components. For example, one such alternative embodiment may comprise multiple storage disks each like storage disk 104 and attached to the same spindle 105 so all such disks rotate at the same speed, and multiple read/write heads and associated positioning arms coupled to one or more actuators.

As another example, in other embodiments there may be multiple read/write heads arranged on a given positioning arm, rather than a single read/write head on the positioning arm as illustrated in the FIG. 1 embodiment.

Additionally or alternatively, both sides of storage disk 104 and any other storage disks in a particular embodiment may be used to store data and accordingly may be subject to read and write operations, through appropriate configuration of one or more read/write heads.

A given read/write head as that term is broadly used herein may be implemented in the form of a combination of separate read and write heads. More particularly, the term "read/write" as used herein is intended to be construed broadly as read and/or write, such that a read/write head may comprise a read head only, a write head only, a single head used for both reading and writing, or a combination of separate read and write heads. A given read/write head such as read/write head 110 may therefore include both a read head and a write head. Such heads may comprise, for example, heads with wrap-around or side-shielded main poles, or any other types of heads suitable for recording and/or reading data on a storage disk. Read/write head 110 when performing read operations or write operations may be referred to herein as simply a read head or a write head, respectively.

The storage device 100 as illustrated in FIG. 1 further comprises a system-on-chip (SOC) 115 that includes a disk controller 120, read channel circuitry 122, internal memory 124, a motor controller 125 and a host interface 126. The SOC 115 in the present embodiment directs the operation of the head and disk assembly 102 in reading data from and writing data to the storage disk 104. For example, the SOC 115 is generally configured to process data received from and supplied to the read/write head 110 and to control positioning of the read/write head 110 relative to the storage disk 104.

The SOC 115 is an example of what is more generally referred to herein as an "integrated circuit." The particular storage device components that are incorporated within the SOC can vary in other embodiments. For example, in some embodiments, components such as the motor controller 125 and host interface 126 can each be implemented as a separate integrated circuit rather than as part of the SOC 115. Also, in other embodiments, the components need not be part of an SOC at all, but could instead be implemented, for example, using one or more separate integrated circuits for each of the disk controller 120, the read channel circuitry 122 and possibly other components.

An exemplary SOC that may be modified for use in embodiments of the invention is disclosed in U.S. Pat. No. 7,872,825, entitled "Data Storage Drive with Reduced Power Consumption," which is commonly assigned herewith and incorporated by reference herein. Other types of integrated circuits that may be used to implement one or more of disk controller 120, read channel circuitry 122, internal memory 124, motor controller 125, host interface 126 or other storage device components of a given embodiment include, for example, a microprocessor, digital signal processor (DSP), application-specific integrated circuit (ASIC), field-programmable gate array (FPGA) or other integrated circuit device.

Portions of the storage device 100 may therefore be implemented at least in part in the form of one or more integrated circuits, such as otherwise conventional integrated circuits designed for use in an HDD and suitably modified to implement baseline correction functionality as disclosed herein.

In an embodiment comprising an integrated circuit implementation, multiple integrated circuit dies may be formed in a repeated pattern on a surface of a wafer. Each such die may include, for example, at least a portion of read channel circuitry 122, and may include other structures or circuits. The dies are cut or diced from the wafer, then packaged as integrated circuits. One skilled in the art would know how to dice wafers and package dies to produce packaged integrated circuits. Integrated circuits so manufactured are considered embodiments of the invention.

The read channel circuitry 122 is coupled to the head and disk assembly 102 via a preamplifier 130. Although illustratively shown as being separate from the head and disk assembly 102, the preamplifier 130 in some embodiments comprises an integrated circuit arranged on the positioning arm 112. Accordingly, the preamplifier in such an arrangement may be viewed as part of the head and disk assembly 102.

The internal memory 124 is internal to the SOC 115 and portions thereof are utilizable by the disk controller 120 and the read channel circuitry 122, and possibly other storage device components. The internal memory 124 illustratively comprises electronic memory such as random access memory (RAM), read-only memory (ROM) or other types of electronic memory, in any combination. In other embodiments, such portions of internal memory 124 may be at least partially incorporated within the disk controller 120, read channel circuitry 122 or other storage device component.

The host interface 126 provides an interface between the SOC 115 and an external host 132, which may comprise, for example, a computer, server, communication device or other processing device in which the storage device 100 is installed. The external host 132 in the present embodiment is therefore considered a separate device that is not part of the storage device 100. Instructions such as read commands and write commands directed to the storage device 100 may originate from the external host 132. The external host 132 is assumed to comprise processor and memory elements similar to those previously described.

Also associated with the storage device 100 is external memory 134. Like the internal memory 124, the external memory 134 illustratively comprises electronic memory such as RAM or ROM, in any combination. In the present embodiment, it is assumed without limitation that the external memory 134 is implemented at least in part as a double data rate (DDR) synchronous dynamic RAM (SDRAM), although a wide variety of other types of memory may be used in other embodiments.

It should be noted that certain operations of the storage device 100 of FIG. 1 may be performed at least in part under the control of software stored in one or more of internal memory 124 and external memory 134 of the SOC 115.

Additionally or alternatively, software stored in a memory of the external host 132 may be used for this purpose. Thus, at least a portion of the functionality of the storage device 100 may be implemented at least in part in the form of software. By way of example, the storage device 100 may be configured under software control to operate in a variety of different modes of operation.

The internal and external memories 124 and 134 and memory of the external host 132 are examples of what are more generally referred to herein as "computer-readable storage media." Articles of manufacture comprising such computer-readable storage media are considered embodiments of the invention. The term "article of manufacture" as used herein should be understood to exclude transitory, propagating signals.

A given computer-readable storage medium has computer program code embodied therein, and may comprise, for example, electronic memory, magnetic memory, optical memory, or other types of memory in any combination.

It is to be appreciated that the storage device 100 as illustrated in FIG. 1 may include other elements in addition to or in place of those specifically shown, including one or more elements of a type commonly found in a conventional implementation of such a storage device. These and other conventional elements, being well understood by those skilled in the art, are not described in detail herein. It should also be understood that the particular arrangement of elements shown in FIG. 1 is presented by way of illustrative example only. Those skilled in the art will recognize that a wide variety of other storage device configurations may be used in implementing embodiments of the invention.

Figure 2:
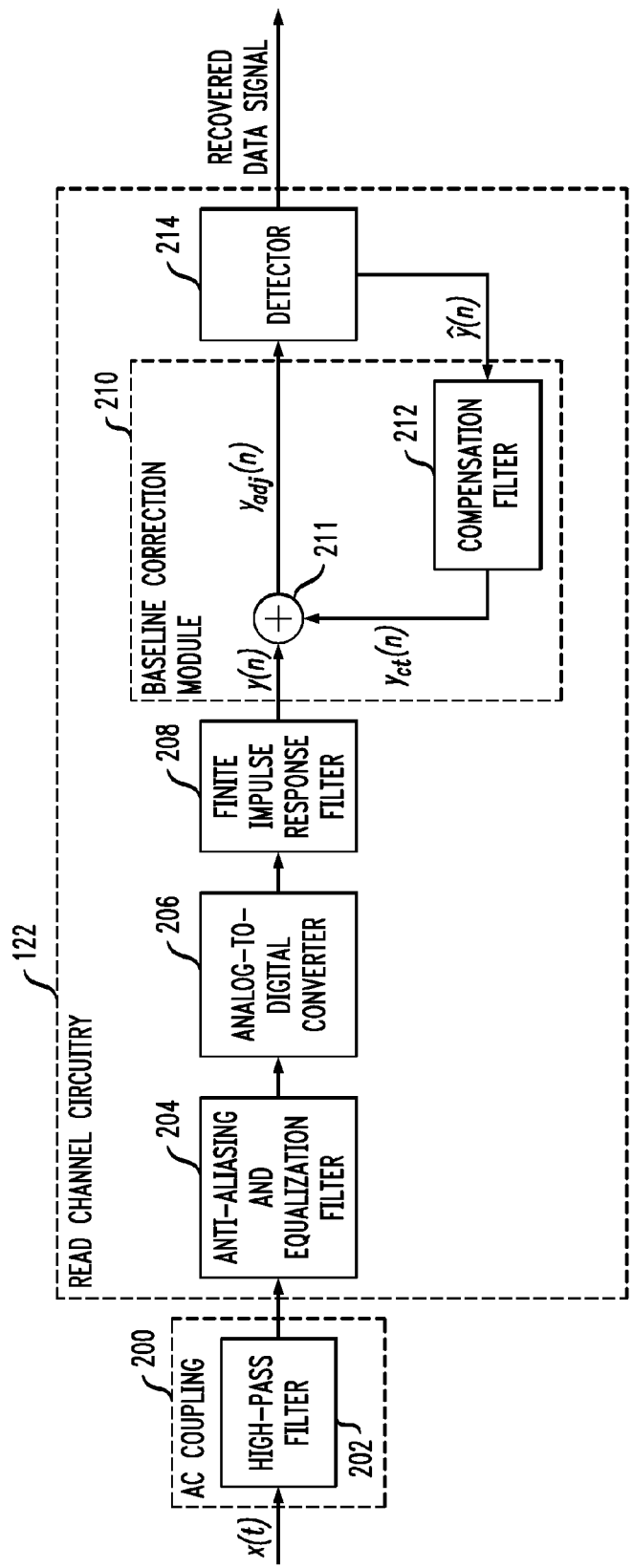
FIG. 2 is a detailed view of portions of the disk-based storage device of FIG. 1, according to an embodiment of the invention.

FIG. 2 shows a more detailed portion of the read channel circuitry 122 and other portions of the storage device 100. In this embodiment, the read channel circuitry 122 comprises an anti-aliasing and equalization filter 204, an analog-to-digital converter (ADC) 206, a finite impulse response (FIR) filter 208, a baseline correction module 210 and a detector 214. FIG. 2 also shows an alternating current (AC) coupling 200 including a high-pass filter 202. The baseline correction module 210 comprises a signal combiner 211 and a compensation filter 212.

The AC coupling 200 receives an analog signal, denoted x(t) in FIG. 2. The AC coupling 200 may be performed in preamplifier 130. The high-pass filter 202 receives the analog signal x(t) and removes relatively low-frequency energy from the analog signal x(t). In storage device 100, and in other types of HDDs, analog signals contain direct current (DC) energy. The analog input x(t) is an example of a read channel target containing DC energy. This energy is attenuated due to the high-pass pole of the AC coupling 200.

Embodiments of the invention provide techniques which allow for baseline recovery of the relatively low-frequency energy removed from the analog signal x(t) in the high-pass filter 202, and more generally the AC coupling 200. Baseline recovery, or baseline correction, restores at least a portion of the low-frequency energy removed from analog signal x(t) due to the high frequency pole of the high-pass filter 202. Accurate knowledge of the pole of the high-pass filter 202 leads to improved baseline correction. Recovery is performed through the use of a low-pass filter with a pole matched to the high-pass filter 202 of the AC coupling 200. The compensation filter 212 is an example of such a low-pass filter. Embodiments auto-detect the pole of the high-pass filter 202, and use this estimate and other information to set the pole of compensation filter 212.

Anti-aliasing and equalization filter 204 receives the filtered analog signal, and performs anti-aliasing and equalization of the filtered analog signal. An output of the anti-aliasing and equalization filter 204 is provided to ADC 206, which converts the output into a digital signal. FIR filter 208 further equalizes the digital signal to a target. The FIR filter 208 may be a multiple-tap digital FIR (DFIR) which filters X samples of digital signal output from ADC 206 to yield Y samples, denoted y(n) in FIG. 2.

Baseline correction module 210 includes signal combiner 211 and compensation filter 212. The signal combiner 211 combines y(n) with an output of the compensation filter 212, denoted $y_{cf}(n)$ in FIG. 2, to produce $y_{adj}(n)$. The output of the compensation filter 212, $y_{cf}(n)$, approximates the energy lost to the high-pass of the AC coupling 200. Compensation filter 212 receives as input a reconstructed signal, denoted $\hat{y}_n$ in FIG. 2, from detector 214.

The detector 214 obtains a recovered data signal using the digital signal $y_{adj}(n)$. The detector 214 also obtains a reconstructed signal, $\hat{y}_n$, which is an approximation of the original data stream. Reconstructed signal $\hat{y}_n$ represents ideal samples that would be output from the FIR 208 with no noise or equalization error. Sequence detector decisions from the detector 214 reconstruct an ideal read head signal before processing in the high-pass filter 202 as $\hat{y}_n$.

The analog signal, x(t), may be represented as follows $$x(t) = \sum_{n=-\infty}^{\infty} (-1)^{b_k} \delta(k) p(t - kT_o) \quad (1)$$

where $b_k$ is the transmitted data bit at time k and is in the set {0,1}, p(t) is the communication channel impulse response and $T_o$ is the data transmission period. The detector 214 target assumes a finite length impulse response p(t). The anti-aliasing and equalization filter 204 in conjunction with FIR 208 are used to equalize the input signal such that it better matches the finite impulse response assumption used by the detector 214. Sampling x(t) at the baud rate $T_o$ results in $$x(nT_o) = \sum_{n=-\infty}^{\infty} (-1)^{b_k} \delta(k) p(nT_o - kT_o) \quad (2)$$

If $p(nT_o-kT_o)$ is non-zero for n−1, n and n+1, and zero elsewhere, then $$x(nT_o) = \quad (3)$$
$$((-1)^{b_{n-1}} p(nT_o - T_o)) + ((-1)^{b_n} p(nT_o)) + ((-1)^{b_{n+1}} p(nT_o + T_o)).$$

In this case, x(n) is dependent on the previous data bit, the current data bit and the next data bit. The three p(n) terms in Equation (3) form the target used by the detector 214 to detect the original bit sequence $b_k$.

For clarity, let the target be denoted T0, T1 and T2, where T0=$p(nT_o+T_o)$, T1=$p(nT_o)$ and T2=$p(nT_o-T_o)$. If the sum T0+T1+T2 is non-zero, then the target contains DC energy. If the data bits are all ones or all negative ones, then the output x(t) will be non-zero. A long sequence of all ones will result in the output of AC coupling 200 decaying over time according to the pole, or time constant, of the high-pass filter 202.

The compensation filter 212 is designed to put back the energy that is removed by the high-pass filter 202. If the high-pass filter 202 is modeled as H(z) and the compensation filter 212 is modeled as C(z), then C(z)=1−H(z). As long as the detector 214 makes correct decisions, the output of the compensation filter 212 will restore the baseline removed by the high-pass filter 202.

In some embodiments, the high-pass filter 202 model H(z) is $$H(z) = \frac{1+q}{2} \frac{1-z^{-1}}{1-qz^{-1}} \qquad (4)$$

and the compensation filter 212 model C(z) is $$C(z) = \frac{1-q}{2} \frac{1+z^{-1}}{1-qz^{-1}}. \qquad (5)$$

Accurate compensation depends on accurate knowledge of the value of q. Some embodiments use techniques involving an adaptive filter such as compensation filter 212 and a least mean squares (LMS) algorithm to discover the q parameter.

Figure 3:
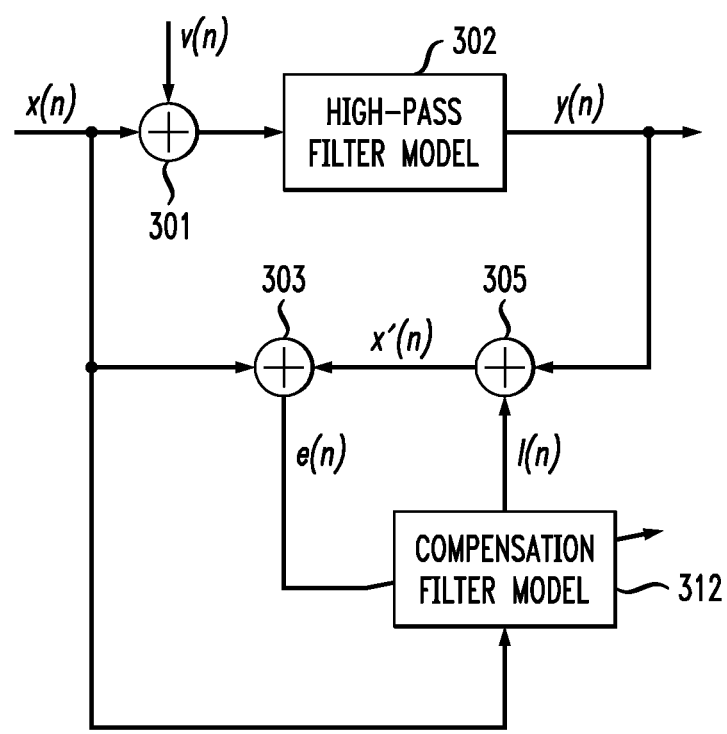
FIG. 3 shows an adaptive model for predicting baseline correction, according to an embodiment of the invention.

FIG. 3 illustrates an adaptive model used in some embodiments for predicting baseline correction. The adaptive model in FIG. 3 may be used to estimate a proper q parameter to provide for accurate baseline correction when the actual q of H(z) is not known. FIG. 3 shows a high-pass filter model 302, a compensation filter model 312, and signal combiners 301, 303 and 305. The high-pass filter model 302 is an example of H(z), while compensation filter model 312 is an example of C(z). The adaptive model in FIG. 3 seeks to estimate the q parameter of high-pass filter model 302. Compensation filter model 312 has an adaptive coefficient q'. In the adaptive model of FIG. 3, the z-domain equations for the compensation filter model 312 C(z), the Y samples Y(z), the X samples X(z), the output of the compensation filter model 312 L(z) and the combination X'(z) are as follows $$C(z)=1-H(z) \qquad (6)$$

$$Y(z)=X(z)H(z) \qquad (7)$$

$$L(z)=X(z)C(z) \qquad (8)$$

$$X'(z)=L(z)+Y(z) \qquad (9)$$

Combining Equations (6), (7), (8) and (9) results in $$X'(z)=X(z) \qquad (10)$$

If C(z) is adapted such that Equation (6) is true, then Equation (10) holds and the error, denoted e(n) in FIG. 3, goes to zero.

In FIG. 3, x(n) denotes a digital representation of the analog input. In the present embodiment, x(n) is not directly observable and instead is re-constructed in detector 214 by using the recovered data bit sequence and the known target. If analog input x(t) is sampled at the baud rate and at the phase dictated by the target, x(t) would be equal to x(n). Digital representation x(n) is combined with a noise component, denoted v(n) in FIG. 3, in signal combiner 301. The result is input to high-pass filter model 302.

A digital representation of the analog output of the high-pass filter model 302 is denoted y(n) in FIG. 3. In the present embodiment, y(n) is not directly observable. As such, some embodiments use an output of ADC 206 as an approximation of y(n). Anti-aliasing and equalization filter 204 is used in order for y(n) to accurately represent the analog signal within the pass-band. In some embodiments, however, such equalization effects are ignored. As the equalization effects typically apply at medium to high frequency, ignoring such effects for low frequency baseline adaptation provides acceptable results. In other embodiments, the equalization effects may be taken into account.

The analog input x(n) is also provided as an input to signal combiner 303 and the compensation filter model 312. The compensation filter model 312 output, denoted l(n) in FIG. 3, is combined with the digital signal y(n) in signal combiner 305 to produce x'(n). Signal combiner 303 combines analog input x(n) with x'(n) to produce error e(n). The error e(n) is used to adapt the compensation filter model 312.

In some embodiments, the following derivation of the LMS equations for adapting the q parameter of the compensation filter model 312 is used. The error e(n) is given by $$e(n)=x(n)-(l(n)+y(n)) \qquad (11)$$

The squared error is thus $$E(n) = e^2(n) = (x(n) - l(n) - y(n))^2. \qquad (12)$$

The partial derivative of the squared error with respect to q' is obtained as follows $$\frac{\partial E(n)}{\partial q'} = 2(x(n) - l(n) - y(n))\frac{\partial}{\partial q'}(x(n) - l(n) - y(n)). \qquad (13)$$

x(n)−l(n)−y(n) is the error e(n). The partial derivatives of x(n) and y(n) with respect to q' are zero as x(n) and y(n) are not functions of the adapted q' of the compensation filter model 312, resulting in $$\frac{\partial E(n)}{\partial q'} = -2e(n)\frac{\partial}{\partial q'}l(n). \qquad (14)$$

To compute the partial derivative of l(n) with respect to q', the following relationship is used $$\frac{L(z)}{X(z)} = \frac{1-q'}{2} \frac{1+z^{-1}}{1-q'z^{-1}}. \qquad (15)$$

Converting the relationship of Equation (15) to the time domain results in $$l(n) = \frac{1-q'}{2}(x(n) + x(n-1)) + q'l(n-1). \qquad (16)$$

Taking the partial derivative of l(n) with respect to q' is thus $$\frac{\partial}{\partial q'}l(n) = l(n-1) - \frac{1}{2}(x(n) + x(n-1)). \qquad (17)$$

Using gradient descent, the update equation for q' is as follows $$q'_{new} = q' \mu e(n)\left(l(n-1) - \frac{1}{2}(x(n) + x(n-1))\right) \qquad (18)$$

where μ is the update gain term.

Figure 4:
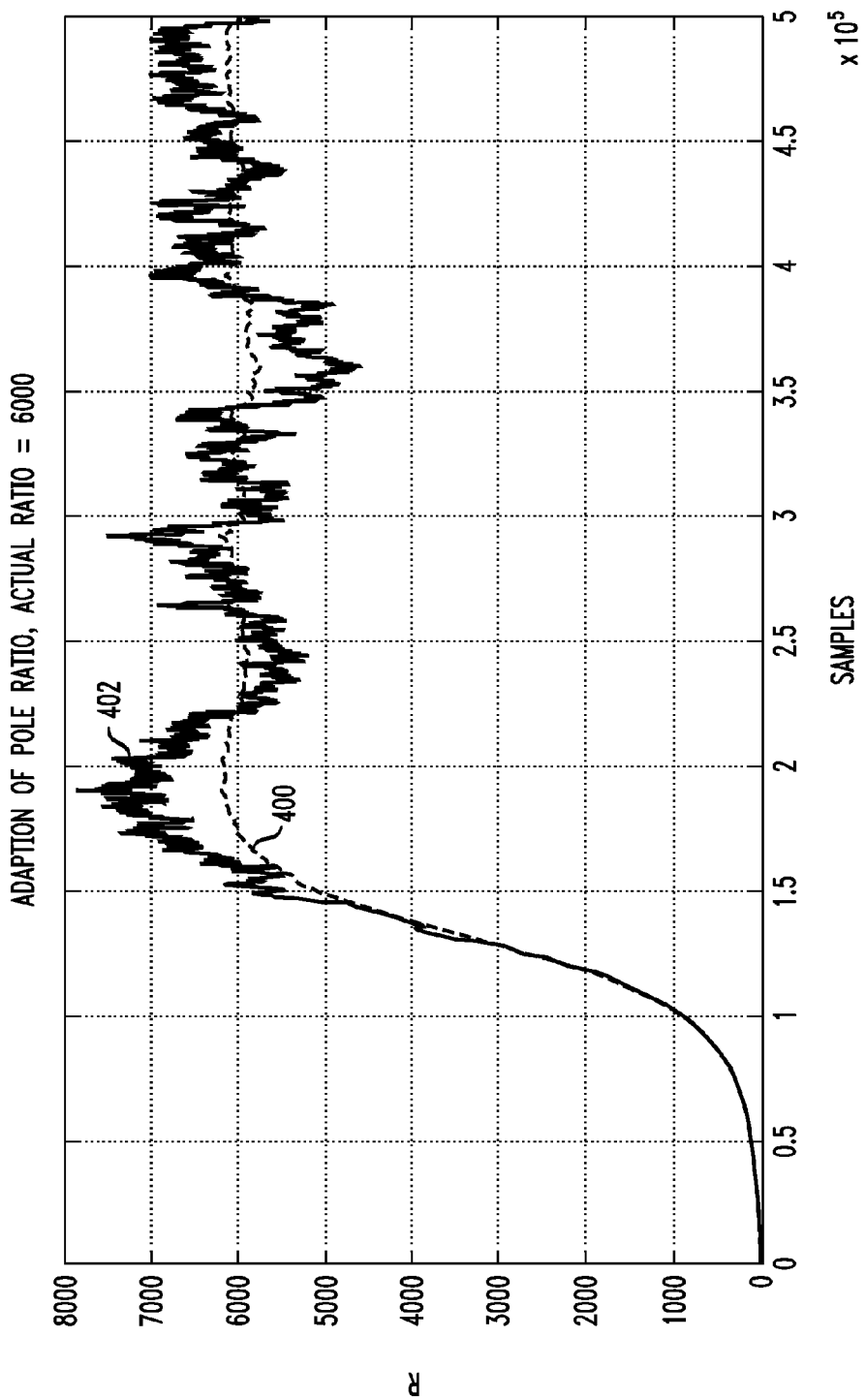
FIG. 4 shows an example of pole ratio adaptation for a filter, according to an embodiment of the invention.

FIG. 4 shows an example of pole ratio adaptation for a filter. More particularly, FIG. 4 shows a plot of the ratio of the data rate to the filter pole as a function of q. This relationship is given by $$R = \frac{-2\pi}{\ln(q)}. \quad (19)$$

If R changes from 100 to 10,000, the resulting q only changes between 0.9391 and 0.9994. As a result, plotting R provides a better visualization of adaptation of the filter pole. The plot in FIG. 4 is a simulation of uniformly random generated x(n) between (−1,1) where v(n) was set to additive white Gaussian noise (AWGN) at two different signal-to-noise ratios (SNRs). Curve 400 shows a simulation with SNR of 30 dB and curve 402 shows a simulation with SNR of 15 dB. In the FIG. 4 plot, the update gain term μ=5e−7 and the unknown R=6000.

Figure 5:
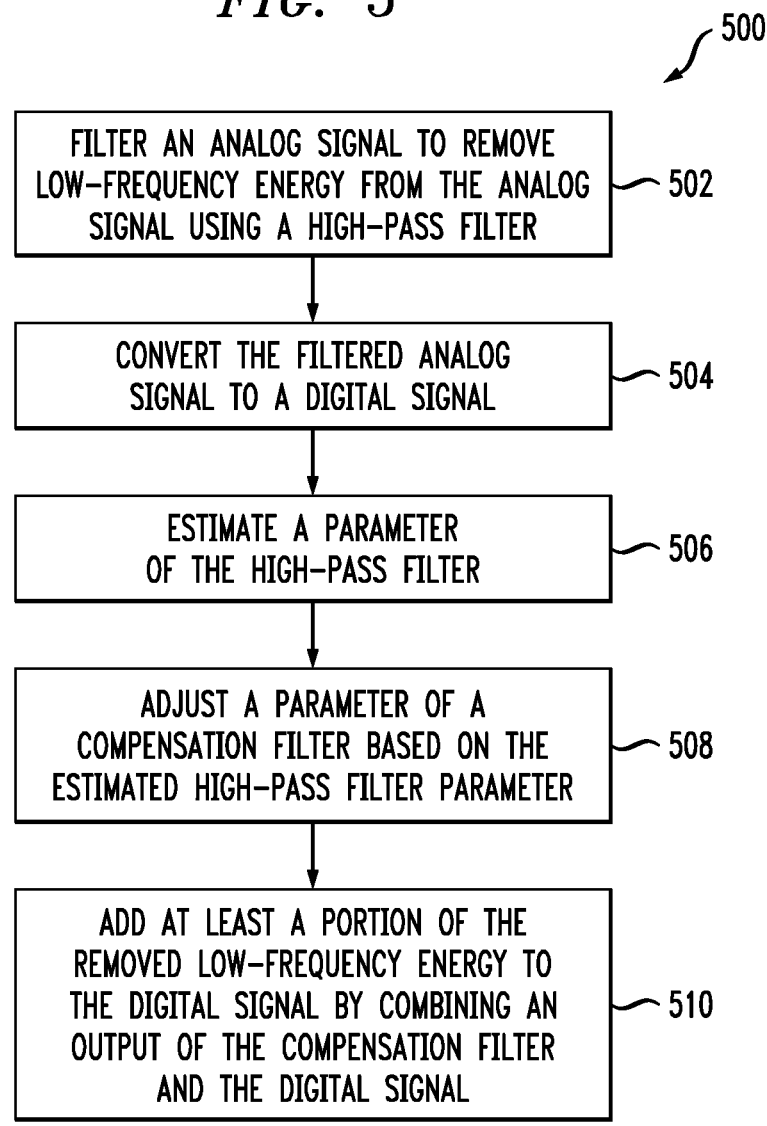
FIG. 5 shows a method of adaptive baseline correction, according to an embodiment of the invention.

FIG. 5 shows a method 500 of adaptive baseline correction. The method 500 begins with step 502, filtering an analog signal to remove low-frequency energy from the analog signal using a high-pass filter. In step 504, the filtered analog signal is converted to a digital signal. Steps 502 and 504 may be performed in high-pass filter 202 and ADC 206 shown in FIG. 2, respectively. The method 500 continues with estimating a parameter of the high-pass filter in step 506. In some embodiments, this estimation utilizes a LMS algorithm, such as the LMS algorithm described above with respect to FIG. 3. In step 508, a parameter of a compensation filter, such as the compensation filter 212 in FIG. 2, is adjusted based on the estimated high-pass filter parameter. The compensation filter in some embodiments is a low-pass filter. At least a portion of the removed low-frequency energy is added to the digital data signal by combining an output of the compensation filter and the digital signal in step 510.

Embodiments of the invention provide a number of advantages relative to conventional techniques. As discussed above, accurate baseline recovery or baseline correction uses knowledge of one or more parameters of a high-pass filter of an AC coupling stage. Using this knowledge, one or more parameters of a compensation filter can be set or adjusted to match the one or more parameters of the high-pass filter. Some embodiments provide techniques for discovering one or more parameters of the high-pass filter automatically, ensuring accurate matching without requiring manual programming by a user. In some conventional techniques, a user must set such parameters manually for multiple different zones of a storage disk. Thus, such conventional arrangements are subject to human error. Further, conventional techniques typically present a user with a limited set of discrete values for the parameters. Optimal values for the parameters, however, may lie between the available choices. Some embodiments allow for auto-adaption of the parameters which allows for more precise tuning and thus more accurate baseline recovery. More accurate baseline recovery directly translates into being able to store more data on a storage disk as baseline recovery is used to achieve better detector performance for a maximum bit error rate (BER).

As indicated elsewhere herein, at least portions of the read channel circuitry 122 or components thereof can be implemented at least in part in the form of software stored in a memory and executed by a processor. Moreover, the particular read channel circuitry 122 configuration illustrated in FIG. 2 and the adaptive model shown in FIG. 3 are presented by way of example only, and should not be considered limiting in any way. Those skilled in the art will recognize that numerous other circuitry configurations may be used to implement the described functionality. Accordingly, the term "read channel circuitry" as utilized herein is intended to be broadly construed so as to encompass circuitry such as the above-noted microprocessor, DSP, ASIC, FPGA or other integrated circuit devices, as well as various portions and combinations of these and other circuitry types.

It is to be appreciated that the particular circuitry and module blocks, models and other features described in conjunction with FIGS. 2 and 3 are presented by way of example only, and other embodiments of the invention may utilize numerous other arrangements of additional or alternative features for implementing baseline correction functionality in a storage device as disclosed herein.

As mentioned previously, the storage device configuration can be varied in other embodiments of the invention. For example, the storage device may comprise a hybrid HDD which includes a flash memory in addition to one or more storage disks.

It should also be understood that the particular storage disk configuration and recording mechanism can be varied in other embodiments of the invention. For example, a variety of recording techniques including shingled magnetic recording (SMR), bit-patterned media (BPM), heat-assisted magnetic recording (HAMR), microwave-assisted magnetic recording (MAMR), and multi-dimensional recording techniques such as two-dimensional magnetic recording (TDMR) can be used in one or more embodiments of the invention. Accordingly, embodiments of the invention are not limited with regard to the particular types of storage media, recording mechanisms and storage formats that are used in a given storage device.

Figure 6:
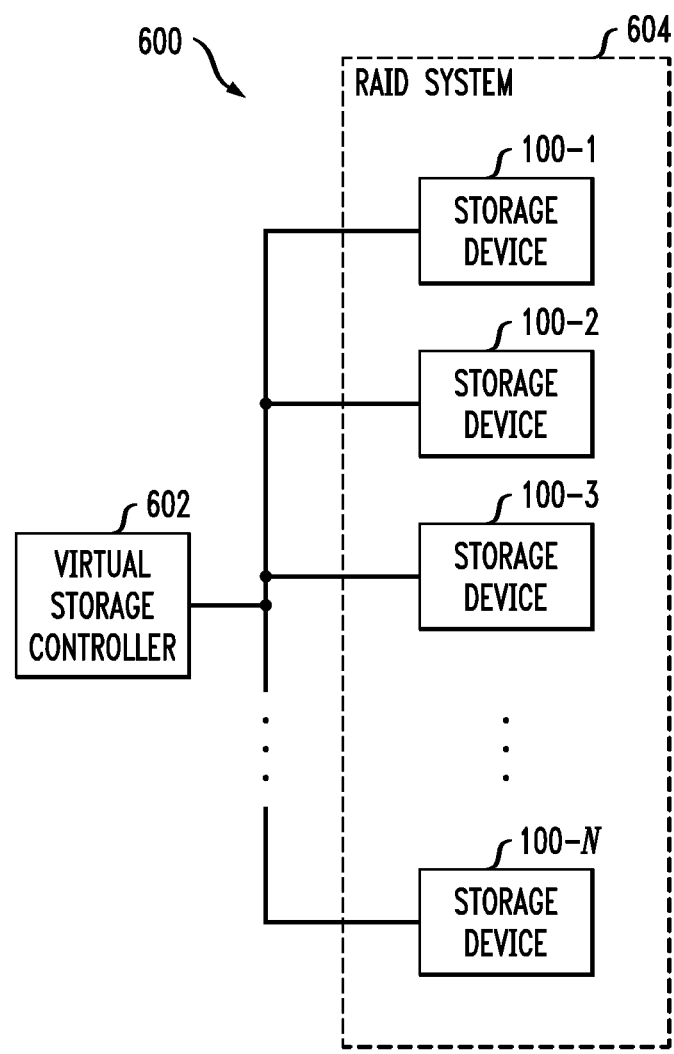
FIG. 6 shows a virtual storage system incorporating a plurality of disk-based storage devices of the type shown in FIG. 1, according to an embodiment of the invention.

Multiple storage devices 100-1 through 100-N possibly of various different types may be incorporated into a virtual storage system 600 as illustrated in FIG. 6. The virtual storage system 600, also referred to as a storage virtualization system, illustratively comprises a virtual storage controller 602 coupled to a RAID system 604, where RAID denotes Redundant Array of Independent storage Devices. The RAID system more specifically comprises N distinct storage devices denoted 100-1, 100-2, ... 100-N, one or more of which may be HDDs and one or more of which may be solid state drives. Furthermore, one or more of the HDDs of the RAID system are assumed to be configured to include baseline correction functionality as disclosed herein. These and other virtual storage systems comprising HDDs or other storage devices of the type disclosed herein are considered embodiments of the invention.

Again, it should be emphasized that the above-described embodiments of the invention are intended to be illustrative only. For example, other embodiments can use different types and arrangements of storage media, read/write heads, read channel circuitry, preamplifiers and other storage device components for implementing the described baseline correction functionality. These and numerous other alternative embodiments within the scope of the following claims will be apparent to those skilled in the art.

What is claimed is:

1. An apparatus, comprising:
an alternating current coupling stage comprising a first filter, the first filter being configured to filter an analog signal to remove relatively low-frequency energy from the analog signal;
read channel circuitry coupled to the alternating current coupling stage, the read channel circuitry comprising:
an analog-to-digital converter configured to convert the filtered analog signal to a digital signal; and
a baseline correction module comprising a second filter, the baseline correction module being configured to estimate a parameter of the first filter, adjust a parameter of the second filter based on the estimated first filter parameter and add at least a portion of the removed relatively low-frequency energy to the digital signal by combining an output of the second filter and the digital signal;

wherein the baseline correction module is configured to estimate the first filter parameter using a least mean squares algorithm based at least in part on the analog signal and the output of the second filter.

2. The apparatus of claim 1 wherein the alternating current coupling stage comprises a pre-amplifier.

3. The apparatus of claim 1 wherein the read channel circuitry further comprises an anti-aliasing and equalization filter configured to equalize the filtered analog signal and provide the equalized analog signal to the analog-to-digital converter.

4. The apparatus of claim 1 wherein the read channel circuitry further comprises a finite impulse response digital filter configured to equalize the digital signal and provide the equalized digital signal to a detector.

5. The apparatus of claim 1 wherein the first filter comprises a high-pass filter, and the estimated first filter parameter comprises a pole of the high-pass filter.

6. The apparatus of claim 5 wherein the second filter comprises a low-pass filter and the second filter parameter comprises a pole of the low-pass filter, and wherein the baseline correction module is configured to adjust the pole of the low-pass filter to substantially match the pole of the high-pass filter within a defined threshold.

7. The apparatus of claim 1 wherein the removed relatively low-frequency energy comprises direct current energy.

8. The apparatus of claim 1 further comprising a detector configured to recover an idealized version of the analog signal prior to filtering in the first filter, wherein the second filter is configured to receive the idealized version of the analog signal.

9. The apparatus of claim 1 wherein the least mean squares algorithm comprises calculating a partial derivative of an error determined using the analog signal, the digital signal and an output of the second filter.

10. The apparatus of claim 9 wherein the error e(n) is $$e(n)=x(n)-(l(n)+y(n))$$

where x(n) denotes a digital representation of the analog signal, l(n) denotes the second filter output, y(n) denotes a digital representation of the analog output of the first filter, and wherein the squared error is $$E(n)=e^2(n)=(x(n)-l(n)-y(n))^2.$$

11. The apparatus of claim 10 wherein the least mean square algorithm comprises calculating the partial derivative of the square error E(n) with respect to q', where q' is the parameter of the second filter.

12. The apparatus of claim 11 wherein the baseline correction module is configured to adjust the second filter by updating q' according to $$q'_{new} = q'\mu e(n)\left(l(n-1) - \frac{1}{2}(x(n)+x(n-1))\right)$$

where $\mu$ is an update gain term.

13. The apparatus of claim 1 wherein the baseline correction module comprises an adder configured to add the output of the second filter and the digital signal.

14. The apparatus of claim 1 wherein the read channel circuitry is fabricated in at least one integrated circuit.

15. A storage device comprising:
at least one storage medium;
a read head configured to read data from the storage medium; and
control circuitry coupled to the read head and configured to process data received from the read head;
the control circuitry comprising the apparatus of claim 1.

16. A virtual storage system comprising the storage device of claim 15.

17. A method comprising:
filtering an analog signal in an alternating current coupling stage to remove relatively low-frequency energy from the analog signal using a first filter;
converting the filtered analog signal to a digital signal;
estimating a parameter of the first filter;
adjusting a parameter of a second filter based on the estimated first filter parameter; and
adding at least a portion of the removed relatively low-frequency energy to the digital signal by combining an output of the second filter and the digital signal;
wherein estimating the first filter parameter comprises using a least mean squares algorithm based at least in part on the analog signal and an output of the second filter.

18. The method of claim 17 wherein the first filter comprises a high-pass filter, the estimated first filter parameter comprises a pole of the high-pass filter, the second filter comprises a low-pass filter, the second filter parameter comprises a pole of the low-pass filter, and adjusting the parameter of the second filter comprises adjusting the pole of the low-pass filter to substantially match the pole of the high-pass filter within a defined threshold.

19. An apparatus comprising:
baseline correction circuitry comprising a first filter, the baseline correction circuitry being configured to:
estimate a parameter of a second filter of an alternating current coupling stage configured to filter an analog signal to remove relatively low-frequency energy from the analog signal;
adjust a parameter of the first filter based on the estimated second filter parameter; and
add at least a portion of the removed relatively low-frequency energy to a digital signal, obtained from an analog-to-digital converter configured to convert the filtered analog signal to the digital signal, by combining an output of the first filter and the digital signal;
wherein the baseline correction circuitry is configured to estimate the second filter parameter using a least mean squares algorithm based at least in part on the analog signal and an output of the first filter.

20. The apparatus of claim 19 wherein the second filter comprises a high-pass filter, the estimated second filter parameter comprises a pole of the high-pass filter, the first filter comprises a low-pass filter, the first filter parameter comprises a pole of the low-pass filter, and the baseline correction circuitry is configured to adjust the pole of the low-pass filter to substantially match the pole of the high-pass filter within a defined threshold.

* * * * *